May 17, 1966 W. A. RIED ETAL 3,251,593
SHEET MATERIAL WORKPIECE SEPARATOR AND FEED APPARATUS
Filed May 22, 1964 2 Sheets-Sheet 1
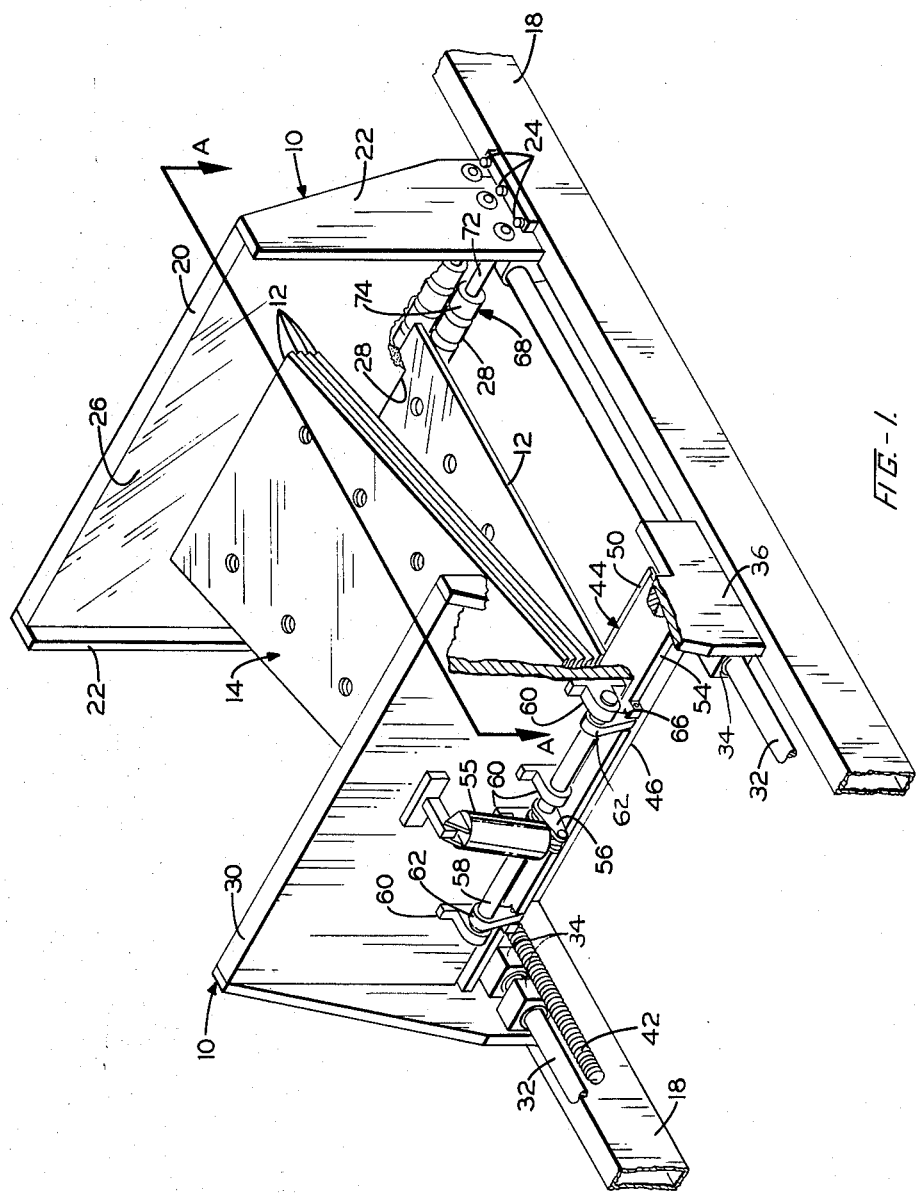
INVENTORS
WALTER A. RIED AND
CHARLES W. WERNTZ
BY
*Jerome R. Frose*
ATTORNEY

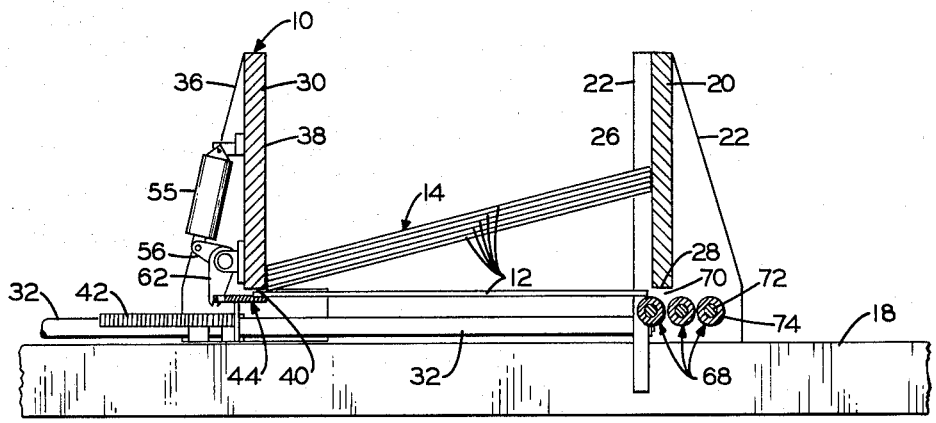
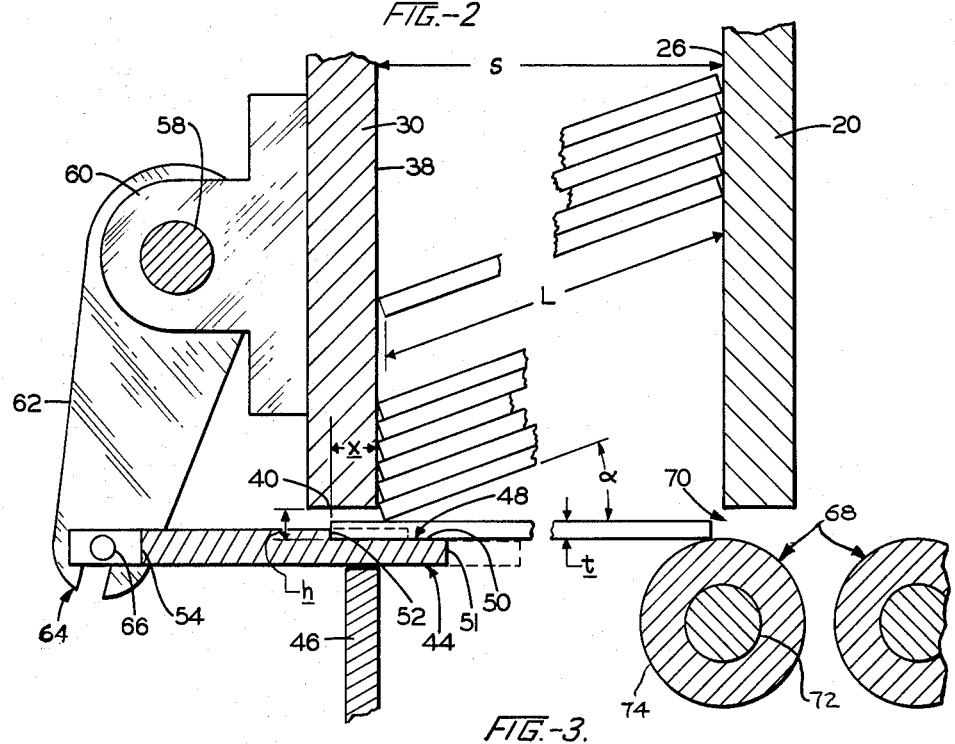

United States Patent Office 3,251,593
Patented May 17, 1966

3,251,593
SHEET MATERIAL WORKPIECE SEPARATOR
AND FEED APPARATUS
Walter A. Ried, St. Louis, and Charles W. Werntz, Ferguson, Mo., assignors to Engel Equipment, Inc., St. Louis, Mo., a corporation of Missouri
Filed May 22, 1964, Ser. No. 369,480
9 Claims. (Cl. 271—10)

The present invention relates generally to a sheet material separator and feed mechanism, and more specifically to apparatus for individually separating metal plates from a nested stack and bottom-feeding the plates one at a time to a machine for subsequent processing.

In the field dealing with the fabrication of sheet material, such as pole blanks for electro-generators and the like, it has been the general practice to punch holes at designated locations in the thin sheet metal and then stack the plates one on top of the other. The hole punching process produces small burrs on that surface of the metal plates presented away from the punch. Upon stacking of the punched plates, these burrs tend to align themselves within the holes of the plates stacked adjacent thereto. Consequently, in any subsequent processing step it is difficult to separate and feed the metal workpieces individually, especially where great care must be taken so as not to scratch or mar the surfaces of the sheet material workpieces. Lubricating oils produce further adherence between the stacked workpieces.

The general purpose of this invention is to provide a sheet material workpiece and bottom-feed mechanism by utilizing a unique sloping orientation of the stacked metal plate workpieces in combination with a reciprocable machine member which causes the lowermost workpiece to be separated and fall to horizontal and then be bottom-fed one at a time to a subsequent processing machine; for example, a burr removing grinder.

Therefore, among the objects of the present invention are the provisions of a mechanism for holding a plurality of stacked metal plates and separating the nested plates individually from the stack, and for bottom-feeding nested sheet metal work pieces one at a time to a subsequent processing machine without marring the surfaces of the workpieces.

In the present invention these purposes (as well as others apparent herein) are achieved generally by providing a separating and bottom-feeding mechanism having a pair of parallel stacking guides which extend vertically at their inner walls to define a stacking space or hopper therebetween, whereby workpieces having a length greater than that of the stacking space may be stacked slopingly between the guides with their lowermost edges adjacent to one of the guides. A sliding ejector is provided beneath the lower edge of this guide and includes a vertical extending abutment which is horizontally reciprocable on its return stroke from a discharge position within the stacking space to a retracted position spacedly outward of the inner wall of the guide, thereby to provide a recess beneath the guide. Upon reciprocating the vertical abutment to its retracted position, the lowermost end of the lowermost workpiece may slip outwardly into the recess and beneath the lower edge of the guide member. A delivery support is spaced beneath the other guide member, which permits the lowermost workpiece to fall to horizontal position separated from the sloping workpieces thereabove. The separated workpiece is then free to be ejected horizontally beneath a second guide as the abutment reciprocates to its discharge position.

Utilization of the invention will become apparent to those skilled in the art from the disclosure made in the following description of the preferred embodiment of the invention, as illustrated in the accompanying drawings, in which:

FIG. 1 is a perspective view of the sheet material separator and feed mechanism of the present invention showing a bottom sheet material workpiece separated from a nested stack and the ejector in discharge position;

FIG. 2 is a cross-sectional view of the sheet material separator and feed mechanism of FIG. 1 taken along line A—A of FIG. 1 but with the ejector in retracted position, prior to the discharge position of FIG. 1, and FIG. 3 is an enlarged, broken sectional view of the mechanism of FIG. 1 showing the horizontally reciprocable slide ejector in retracted position, its discharge position being shown in dashed lines.

Referring now to the drawings, wherein like reference characters designate like or corresponding parts throughout the several views, there is shown in FIG. 1 a sheet material separator and feed mechanism, generally designated 10 especially adapted for separating and bottom-feeding common length sheet metal workpieces 12 from a nested stack 14 of such sheet metal workpieces. The separator and feed mechanism 10 is especially suited for separating and feeding metal workpieces that have undergone a gang punching operation; for example, in the production of thin pole blanks for generators. The gang punching operation produces holes 16 in the workpieces. Also, small burrs along the workpiece surfaces accompany the holes 16 and tend to nest in the holes of adjacent workpieces. These burrs make it both difficult and undesirable to separate the workpieces 12 by sliding them across each other; excessive scratching and marring of the workpiece surfaces would result. Therefore, in the present invention the sheet material separator and feed mechanism 10 is designed first to separate a workpiece 12 from the nested stack 14 and then to feed the separated workpiece 12 from the hopper.

The frame of the separator and feed mechanism 10 consists of two longitudinally extending tubular beams 18 to which a vertical-extending stationary stacking guide plate 20 is securely anchored by means of its flat end flanges 22. The stationary guide plate 20 has a substantially vertical, smooth inner wall 26 which extends downward to terminate in a lower edge 28, immediately above workpiece delivery means to be described hereinafter.

A longitudinally adjustable, stacking guide plate 30 is mounted on longitudinally-extending guide rods 32 by means of ball bushings 34 carried along the inner wall of its end flanges 36 and spaced to provide a gap between the two guide plates. The guide rods 32 are fixedly mounted to the tubular frame beams 18 so that the lower edges of the end flanges 36 are free to slide along the upper surfaces of the beams 18. Similar to stationary guide plate 20, the movable guide plate 30 has an inner wall 38 which extends substantially vertically and parallel to the inner wall 26 of the guide plate 20. Thus, the inner walls 26 and 38 of the mutually spaced guide plates 20 and 30 define a stacking hopper, the edges of the workpieces 12 being abuttingly and slopingly contained between the respective inner walls with the lowermost end adjacent to the guide plate 30. The inner wall 38 of the guide plate 30 extends downwardly to terminate in a lower edge portion 40 which is at substantially the same level as the lower edge portion 28 of the guide plate 20.

Positioning means are provided to adjustably vary the spacing between the vertically-extending stacking guide plates 20 and 30. This positioning means takes the form of a drive screw 42 mounted on the beams 18 and threadedly engaging a gear member (not shown) carried by the adjustable guide plate 30. Because it is essential that the workpieces 12 be slopingly contained between the inner walls 26 and 38 of the guide plates 20 and 30, as will be hereinafter disclosed, the drive screw 42 is employed to adjust the position of the guide plate 30 toward and away from the stationary guide plate 20 so that it may be set to hold the workpieces 12 at an angle; and to adjust and vary the angle. The limits of the angle so to be achieved are set forth hereinafter. The length L of the workpieces 12 is of course greater than the spacing between the inner walls 26 and 38, as adjusted by the screw 42, so that the lowermost ends of the workpieces 12 will be abuttingly confined adjacent to the vertical guide plate 30 just above the lower edge portion 40.

As may best be seen from FIG. 3, sliding ejector means, generally designated 44, is mounted adjacent to the lower edge portion 40 of the vertical guide plate 30 for horizontal reciprocation therebelow. The bottom surface of the sliding ejector 44 rests upon a support block 46 and is free to slide therealong in its horizontal reciprocation. An upwardly presented step-like recess, generally designated 48, is provided along the upper inward portion of the sliding ejector 44. The recess 48 is defined by a horizontally-extending ledge portion 50 which extends from an inner ejector edge 51 outwardly to terminate in a vertical abutment portion 52. The abutment portion 52 extends upward toward, but terminates below, the lower edge 40 of the vertical guide plate 30. For reasons to be set forth hereinafter, the vertical abutment portion 52 extends upwardly from the ledge portion 50 a distance less than the thickness $t$ of the workpieces 12. Also, the vertically distance $h$ between the ledge portion 50 and the lower edge 40 should satisfy the following relationship to permit one and only one workpiece 12 to be separated at a time:

$$t < h < (t + tX \cos \alpha)$$

Means for reciprocating the sliding ejector 44 are mounted on the outer wall of the movable guide plate 30. These means are mechanically coupled to the ejector 44 to provide it with a reciprocatory throw X. As a result, the abutment 52 moves alternately between its retracted position as shown by the solid lines in FIG. 3 and its discharge position, indicated by the dashed line of FIG. 3.

An air cylinder 55 has its plunger or piston member coupled to a bell crank member 56 at its lower end. In turn, the bell crank member 56 engages an actuating shaft 58 which is journaled in pillow blocks 60 secured to the outer wall of the guide plate 30. Suspended from the actuating shaft 58 are two link members 62 having lower forked-end portions 64. The forked-end portions 64 of the link members 62 have a rod 66 passed through the U-shaped notch therein. This rod 66 continues horizontally through the heel portion 54 of the sliding ejector 44.

It may be seen that the stroked actuation of the air cylinder 55 by means of an external air pressure source (not shown) will result in a degree of reversing angular rotation of the actuating shaft 58 by the bell crank member 56. This reversing rotation, in turn, imparts to the link members 62 a stroking movement which includes a principal horizontal and a small vertical component. The forked-end portions 64 of the link members 62 eliminate the vertical component of such movement and yield a horizontal impulse stroke of the sliding ejector 44. By causing the air cylinder piston to reciprocate, the abutment portion 52 of the ejector 44 is carried from its retracted position spacedly outward of the inner wall 38 to its discharge position between the guide plates 20 and 30.

Spaced beneath the lower edge 28 of the stationary guide plate 20 are delivery means for receiving the separated workpiece and guiding it as it is ejected from the hopper in a manner to be described hereinafter. This delivery means takes the form of support members, generally designated 68, spacedly positioned below the lower edge 28 of the guide plate 20 to delimit a discharge slot 70 therebetween. The support members 68 consist of rotatable rods 72 journaled at their ends in the flanges 22 of guide plate 20. Positioned on the rods 72 are cylindrical shaped pads 74 which extend inwardly of the inner wall surface 26 and which preferably are composed of an adhesive or magnetic material to assist in feeding the ejected workpieces 12 from the mechanism 10 without the possibility of scratching or marring their surfaces.

In operation, the drive screw 42 is rotated to adjust the spacing between the guide plates 20 and 30 so that the nested stack 14 of sheet metal workpieces 12 is slopingly contained between the inner walls 26 and 38 at an angle $\alpha$. The angle $\alpha$ which will permit separation of the lowermost workpiece, yet prevent jamming up in the mechanism 10, depends upon such varying factors as friction present and speed of operation as well as the weight, thickness $t$, and length L of the workpieces and the vertical height $h$ between the ejector ledge 50 and the guide plate lower edge 40. Angle $\alpha$ must remain small enough to permit the lowermost edge of the workpiece 12 to slip outward following the abutment 52 and the uppermost edge to fall to horizontal position without the upper surface of the workpiece binding on the lower corner formed by the intersection of the inner wall 38 and the lower edge 40 of the guide plate 30. In the case of rolled steel pole backs having a thickness $t$ of $3/32$ inch and a length L of 11 inches, and where the vertical distance $h$ is approximately 0.1 inch, it has been found that an angle $\alpha$ of approximately 10 degrees is suitable for the desired separation and yet prevents jamming of the mechanism 10. Generally, a workable angle may readily be found by setting the guide plate spacing S (which equals $L \cos \alpha + t \sin \alpha$) as widely as will support the work pieces in the hopper at a finite angle to the horizontal.

Upon horizontal reciprocation of the sliding ejector 44, as the vertical abutment portion 52 is moved outwardly of the inner wall 38 of the guide plate 30, the lowermost end of the lowermost workpiece 12 is permitted to slip outwardly beneath the lower edge 40 a sufficient distance to permit its uppermost end to fall free of the constraint offered by the inner wall 26 of the stationary guide plate 20. The lowermost workpiece 12 will then fall to horizontal position, separated from the sloping, nested workpieces thereabove and supported on the inward extending pads 74 of the support member 68 and the ledge portion 50 of the ejector 44. Where the suitable relationships between L, $t$, $h$ and $\alpha$ are established, only the lowermost workpiece 12 will be so separated and the workpiece immediately thereabove will remain slopingly contained between the inner walls 26 and 38 of the guide plates.

The lowermost workpiece 12 having separated from the nested stack 14 under its own weight and assumed a horizontal position, the air cylinder 55 is again actuated to return the vertical abutment portion 52 of the sliding ejector 44 from its retracted position to its discharge position, as indicated by the dashed lines in FIG. 3. The stroking of the air cylinder 55 will thus deliver to the lowermost workpiece 12 a horizontal impulse, accelerating and expelling it through the gap or discharge slot 70 provided below the stationary guide plate 20. It should be noted that the vertical extent of the abutment portion 52 is less than the thickness $t$ of the workpiece so that it will not interfere with the workpieces thereabove as the lowermost, horizontally-oriented workpiece 12 is discharged. Its discharge and feeding to subsequent processing equipment (for example, grinders) may be assisted by powering the support members 68 to serve as feed rollers to such processing equipment.

Repeated reciprocation of the sliding ejector 44 by the stroke air cylinder 55 results in continuous separation and bottom-feeding of the workpieces 12 from the nested stack 14, in the unique manner described.

Obviously, many modifications and variations of the present invention may be made in the light of the above teachings. While reference has been made to the guide plates being vertical and the separating movement of the supported workpieces as characterized by falling from angular position from the stacked position at the angle α to a horizontal position, some departures from the angularity so indicated may be utilized without departing from the teachings of this invention. For example, the angular motion of the lowermost workpiece, while being separated, may be a rotation decreasing the angle of the workpiece from the stacked position angle to some other separated angle. It is therefore to be understood that within the scope of the appended claims, the invention may be practiced otherwise than as specifically described.

We claim:

1. Apparatus for separating and bottom-feeding common length sheet material workpieces from a nested stack, comprising
    first and second guide means mutually spaced and having substantially vertical-extending inner walls defining a stacking hopper therebetween for abuttingly containing the edges of the stacked workpieces inwardly thereof, whereby workpieces having a length greater than that of the stacking hopper may be stacked slopingly between said inner walls with their lowermost ends adjacent to said first guide means,
    slide means spaced beneath the lower edge of said first guide means and having a horizontally reciprocable upwardly presented recess portion therein for receiving the lowermost end of the lowermost workpiece on its return stroke to a retracted position spacedly outward of the inner wall of said first guide means, whereby said lowermost end may slip outwardly beneath the lower edge of said first guide means, the lowermost workpieces then falling to horizontal position separated from the sloping workpiece thereabove,
    means mechanically coupled to said slide means for reciprocating the recess portion thereof alternately to a discharge position inwardly of said inner wall of said first guide means and outwardly to said retracted position, and
    delivery means spaced beneath said second guide means at the level of said slide means for receiving the separated workpiece at the horizontal position and guiding the workpiece as it is ejected from said hopper on the forward stroke at said slide means to its discharge position.

2. The sheet material workpieces separator and bottom-feed apparatus of claim 1, further comprising
    means mounting said mutually spaced first and second guide means for adjustably varying the distance between said guide means, whereby the sloping angle at which the workpieces in the hopper are supported may be varied.

3. Apparatus for separating and bottom-feeding common length sheet material workpieces from a nested stack, comprising
    first and second stacking guides having vertical inner walls spaced parallel to each other and defining a stacking space therebetween, whereby workpieces having a length greater than that of the stacking space may be stacked slopingly between said guides with their lowermost ends adjacent to the first guide,
    ejector means beneath the lower edge of the first of said guides, and including abutment means horizontally reciprocable on its return stroke from a discharge position within the stacking space to a retracted position spacedly outward of the inner wall of said first guide, thereby to provide a recess beneath said first guide, and
    delivery means spaced beneath the lower edge of the second of said guides,
    whereby upon reciprocating the abutment means to its said retracted position, such lowermost end of the lowermost workpiece may slip outwardly into such recess beneath the lower edge of the first guide, the lowermost workpiece then falling to horizontal position separated from the sloping workpieces thereabove, such separated workpiece then being ejected horizontally beneath said second guide as the abutment means reciprocates to its discharge position.

4. Apparatus for separating and bottom-feeding common length sheet material workpieces from a nested stack, comprising
    first and second parallel, vertical-extending guide plates spaced apart and having inner walls defining a stacking hopper therebetween, each of said guide plates having a lower edge portion terminating at substantially the same level, whereby the workpieces are slopingly confined between said inner walls with their lower ends adjacent said first plate,
    a sliding ejector mounted for substantially horizontal reciprocation adjacent to the lower edge portion of said first guide plate,
    said sliding ejector having a horizontally-extending and upwardly-presented ledge portion spaced below the lower edge portion of said first guide plate and an abutment portion extending substantially upwardly therefrom,
    whereby said abutment portion is reciprocable to a retracted position and a discharge position outwardly and inwardly of said first plate inner wall respectively,
    a support member spacedly positioned below the lower edge of said second guide plate to delimit a discharge slot therebetween, said support member extending inwardly of the inner surface of said guide plate,
    whereby a gap is defined between said support member and the sliding ejector,
    means operatively coupled to said sliding ejector for reciprocating it substantially horizontally,
    whereby said lower end of the lowermost stacked workpiece may slip outwardly following said abutment to its retracted position, such lowermost workpiece then falling angularly to position across said gap and thereby separating itself from the stacked workpieces thereabove.

5. The sheet material workpiece separator and bottom-feed apparatus of claim 4, further comprising
    horizontally extending support bars for mounting said first guide plate spacedly from said second guide plate, and
    a horizontally extending drive gear threadingly engaging said first guide plate to adjustably vary the distance between said first and second guide plates.

6. The sheet material workpiece separator and bottom-feed mechanism apparatus of claim 4, wherein said means for reciprocating said slide ejector comprises,
    a stroke air cylinder, and
    mechanical link means engaging said sliding ejector and operated by said stroke air cylinder for transforming a stroke cycle of said air cylinder into horizontal reciprocation of said slide,
    whereby short impulse strokes are imparted to said slide thereby to drive the workpieces across the gap and through said slot.

7. The sheet material workpiece separator and bottom-feed apparatus of claim 4, said support member being
    a feed roller for smoothly delivering the workpieces through the slot and into subsequent processing apparatus.

8. The sheet material workpiece separator and bottom-feed apparatus of claim 4, wherein
    the abutment extends upwardly from the ledge portion a distance less than the thickness of the workpieces to be discharged.

9. Apparatus for separating and bottom-feeding sheet material workpieces of a common length $L$ and a thickness $t$ from a nested stack, comprising first and second parallel, vertical-extending guide plates spaced apart and having inner walls defining a stacking hopper therebetween, each of said guide plates having a lower edge portion terminating at substantially the same level, whereby the workpieces are stacked at an angle $\alpha$ to the horizontal between said inner walls, the spacing of said guide plates being the horizontal distance $L \cos \alpha + t \sin \alpha$, a sliding ejector mounted for substantially horizontal reciprocation adjacent to the lower edge portions of said first guide plate, said sliding ejector having a horizontally-extending and upward presented ledge portion spaced below the lower edge portion of said first guide plate at a vertical distance $h$, and an abutment portion extending upwarrdly therefrom less than the thickness $t$ of the workpieces, means operatively coupled to said sliding ejector for reciprocating it substantialy horizontally between a retracted position and a discharge position outwardly and inwardly respectively of said first plate inner wall, the retracted position being at least as far from the remote guide plate as the length $L$, whereby said lower edge of the lowermost stacking workpiece may slip outwardly following said abutment to its retracted position, such lowermost workpiece then falling to horizontal position separated from the stacked workpieces thereabove, and a support member spacedly positioned from the lower edge of said second guide plate to delimit a discharge slot therebetween, said support member extending inwardly of the inner surface of said second guide plate to receive the upper ends of the workpieces falling from the nested stack, wherein $h$ is found from the relationship:

$$t < h < (t + t \cos \alpha)$$

References Cited by the Examiner

UNITED STATES PATENTS

| | | | |
|---|---|---|---|
| 913,628 | 2/1909 | Dempewolf. | |
| 1,150,210 | 8/1915 | Langston | 271—44 |
| 2,361,364 | 10/1944 | Bell | 221—293 |
| 2,827,290 | 3/1958 | Dixon et al. | 271—44 X |
| 2,915,309 | 12/1959 | McGihon | 271—10 |

M. HENSON WOOD, JR., *Primary Examiner.*

A. KNOWLES, *Assistant Examiner.*